United States Patent [19]

Sono et al.

[11] Patent Number: 5,268,071
[45] Date of Patent: Dec. 7, 1993

[54] PROCESS OF PRODUCING A MAGNETIC DISK SUBSTRATE

[75] Inventors: Kenzou Sono, Tokyo; Eiji Okuda, Sagamihara; Masahiro Oikawa, Tsukuba; Shinya Kawakita, Yokkaichi, all of Japan

[73] Assignee: Nippon Sheet Glass, Tokyo, Japan

[21] Appl. No.: 943,378

[22] PCT Filed: Apr. 26, 1990

[86] PCT No.: PCT/JP90/00547
§ 371 Date: Dec. 20, 1990
§ 102(e) Date: Dec. 20, 1990

[87] PCT Pub. No.: WO90/13115
PCT Pub. Date: Nov. 1, 1990

Related U.S. Application Data

[63] Continuation of Ser. No. 623,667, Dec. 21, 1990.

[30] Foreign Application Priority Data

Apr. 27, 1989 [JP] Japan .................................. 1-108130

[51] Int. Cl.$^5$ ............................................. H01L 21/00
[52] U.S. Cl. ........................................ 156/663; 65/31; 156/635; 156/637; 156/625
[58] Field of Search ............... 156/635, 637, 663, 625; 65/31

[56] References Cited

U.S. PATENT DOCUMENTS

| | | | |
|---|---|---|---|
| 3,773,489 | 11/1973 | Forker et al. | 65/30.14 |
| 4,747,093 | 5/1988 | Benne et al. | 156/663 |
| 4,859,505 | 8/1989 | Nakayama et al. | 156/663 |
| 4,985,306 | 1/1991 | Morizane et al. | 156/628 |

FOREIGN PATENT DOCUMENTS 63-160010  7/1988  Japan .

*Primary Examiner*—Brian E. Hearn
*Assistant Examiner*—George Goudreau
*Attorney, Agent, or Firm*—Woodcock Washburn Kurtz Mackiewicz & Norris

[57] ABSTRACT

The present invention relates to a process of producing a magnetic disk substrate comprising etching the surface of a glass substrate to form minute irregularities on the surface thereof, by employing the molten salt containing at least a kind of nitrite of cation, which process can prevent the deterioration of the mechanical property and magnetic property of the glass sabstrate for use as a magnetic disk for a long time.

4 Claims, No Drawings

PROCESS OF PRODUCING A MAGNETIC DISK SUBSTRATE

This is a continuation, of application Ser. No. 623,667, filed Dec. 21, 1990.

The present invention relates to a process of forming irregularities on the surface of a magnetic recording glass disk substrate. More specifically, the present invention relates to a process of processing the surface of the glass substrate for use as a magnetic disk whereby the deterioration of the mechanical, magnetic and other properties of the substrate can be prevented for a substantial period of time.

Compositions comprising a magnetic disk substrate, a magnetic film and a protecting film, formed by processes such as sputtering, metal plating, vapor deposition and the like, are called magnetic recording media (referred to as "media" hereinafter).

The main composition of a magnetic memory device comprises the media and a magnetic head for recording and reproduction (referred to as "head" hereinafter). Typically, the head and the media are in contact with each other when the magnetic memory device commences operation. By rotating the media, a space is generated between the head and the surface of the media by the formation of an air layer. Once operating in this state, recording and reproducing operations can be carried out. When the operation of the memory device is terminated, the rotation of the media stops. The head and the media return to the contact state.

It should be understood that contact frictional force is generated when the operation of the memory device is commenced and terminated causing abrasion to the head and media. Such abrasion causes the mechanical and magnetic properties of the media to deteriorate. This frictional force is usually referred to as contact start stop resistance and is abbreviated as CSS.

If water is adsorbed onto the surface of a media in an atmosphere with high humidity, the water is diffused into an interstice of the head and the media, causing an agglutination phenomenon. Under these conditions, the head and the media may be exposed to a high degree of resistance when operation of the memory device begins. Such resistance may eventually cause damage to the head and destruction of the media. This phenomenon is usually referred to as head crash.

Since glass has an excellent smooth surface, is hard and has a high resistance against deformation together with few surface defects it is particularly useful as a magnetic disk substrate appropriate for high information density storage. (See Japanese Patent Laid-open No. 122707/1974).

The contacting area of the media surface with the head increases when a glass substrate is used due to the superior mirror surface property of the glass. As a result of an increased contacting area there is also an increase in frictional resistance and adhesion forces generated between the head and the media as compared with a media employing a substrate having a rougher surface than glass.

In order to overcome such problems, a method to reduce frictional force and adhesion force generated between a head and a media, by mechanically forming minute irregularities on the surface of a substrate has been disclosed (for example, Japanese Patent Laid-open No. 123906/1978). Alternatively, chemical etching may be used to form irregularities on the surface of a glass substrate (for example, Japanese Patent Laid-open No. 136035/1985). A method combining the two aforementioned methods has also been disclosed (for example, Japanese Patent Laid-open No. 160010/1988).

To improve the frictional property of a glass substrate, the minute irregularities formed on the surface of the glass are preferably 0.1 to several $\mu$m in pitch and have a depth up to several tens of nm.

The present invention is carried out to solve the aforementioned problems caused by CSS resistance and head crash when using magnetic disk glass substrates.

Conventional mechanical processes, such as the process of forming irregularities by polishing a substrate with tapes coated with fine powders such as $Al_2O_3$, SiC, etc., may cause the development of cracks on the surface of a fragile material including a glass substrate. The cracks have caused indisputable problems by damaging the smoothness and reducing the mechanical strength of the surface of a glass substrate.

Additionally the interstitial part generated by a sharp recess, crack, etc. in the glass cannot be sufficiently washed and dried. Therefore, residues such as stain and the like contribute to the deterioration of the magnetic property over time. Furthermore, such sharp recesses and cracks formed in the glass eventually lead to head crash.

It takes many hours to form the surface irregularities by drawing lines softly with abrasive grains of a small particle size so as to decrease the occurrence of such recesses, cracks, etc. Consequently larger amounts of tape materials and abrasive grain must be used thereby raising the cost of the process. In addition, using an abrasive grain having a small particle size cannot form irregularities having the preferred size.

The chemical process described above requires forming a metal layer which acts as a masking film during chemical etching on a glass substrate using heat treatment.

The aforementioned process of combining the mechanical process and the chemical process has problems related to its practical use, such as requiring tough process controls because of the increase in the number of processing stages, and the unavailability of an effective means for controlling the concentration of hydrofluoric acid to be used for etching.

The present invention has been carried out in order to solve the aforementioned problems, by employing a molten salt containing at least a kind of nitrite of cation for practicing etching in the process of producing a magnetic disk substrate comprising etching the surface of a glass substrate and forming minute irregularities on the surface thereof.

The etching can be practiced by immersing a glass substrate in a molten salt in the melting state, which is heated at for example 400° to 550° C.

The nitrite to be used in the present invention includes for example nitrites of monovalent cations, illustrated as $M_1NO_2$ ($M_1$ is Li, Na, K, Cs, Pb, Tl, etc.), and nitrites of divalent cations, illustrated as $M_{11}(NO_2)_2$ ($M_{11}$ is Mg, Ca, Sr, Ba, Cu, Pb, etc.).

The molten salt containing at least a kind of nitrite of cation includes for example a molten salt of a single species of the nitrites, mixed molten salts of the nitrites, or mixed salts of one or two or more species of the nitrites with other salts.

If a mixed molten salt is used the nitrite ion content is preferably 5 anion mol % or more to the total amount of anions such as $NO_3$, $NO_2$, $SO_3^{2-}$, etc. in the mixed molten salt; and 10 anion mol % or more is more preferable. A nitrite ion content less than 5 anion mol % reduces the etching rate and causes a decrease in productivity.

The nitrite may be prepared into a mixed salt of one or two or more species of other salts, but a combination thereof with nitrate represented by $M_1NO_3$ ($M_1$ is Li, Na, K, Cs, Pb, Tl, etc.) and $M_{11}(NO_3)_2$ ($M_{11}$ is Mg, Ca, Sr, Ba, Cu, Pb, etc.) is preferable because the molten salts of such nitrates exhibit similar properties with easy handling. The molten salt containing a monovalent cation is more preferable than the molten salt containing a divalent cation because it induces a more rapid etching velocity.

The treatment time of the etching is adjustable, depending on each condition including the composition of the glass substrate, the composition of the molten salt, and the treatment temperature. The treatment temperature is usually 400° to 450° C.; more preferably it is 420° to 450° C. The size of the irregularities on the surface of a glass substrate are usually 10 to 100 nm in depth; more preferably 20 to 50 nm. On the other hand, the pitch is usually 30 to 500 nm. It is well known to determine a roughness Ra of the substrate based on the depth of the irregularities. The roughness Ra is the arithmetical mean deviation of the depth measurements and is approximately one tenth (1/10) of the depth of the irregularities.

It has not yet been elucidated why the molten salt containing nitrite to be used in the present invention selectively etches the surface of a glass substrate to form irregularities suitable for a magnetic disk substrate. Nonetheless, simple procedures such as uniform stirring and circulation of the molten salt realize the formation of the objective surface irregularities on the entire surface of a glass plate or on several glass plates simultaneously by a single treatment applying a great amount of the molten salt.

EXAMPLE 1

Commercially available soda lime glass was cut into a predetermined size and the margin and surface thereof were polished to prepare a glass disk substrate having a smooth surface.

The glass substrate was preheated to 465° C., it was then immersed in the molten salt of 100 mol % $KNO_2$, heated and maintained at 465° C., for about 2 minutes. Subsequently, it was taken out and left to cool. The molten salt was stirred and circulated during the immersion.

After cooling, the glass disk substrate was washed and dried. It was found that numerous irregularities having a pitch of 0.1 μm to several μm and a depth of several nm to several hundreds nm and having a relatively gradual slope were uniformly formed over the entire surface of the glass disk substrate. A metal base film (Cr), and a Co magnetic film (Co: 62.5 wt %, Cr:7.5 wt %, Ni:30 wt %) were then formed on the glass disk substrate using a sputtering process, to finally prepare a magnetic disk coated with a carbon protecting film of about 38 nm in thickness (glass Ti:75 nm Al; 40 nm Cr:150 nm / CoCrNi:60 nm).

The magnetic disk thus prepared was subjected to a routine CSS test to measure its durability. Even after the CSS test was repeated thirty-thousand times or more, the magnetic power of the magnetic disk employing the glass substrate prepared according to the present invention was not decreased below 90%. The CSS test was carried out at the following condition; cleanliness; 100, humidity; 21±2 ° C., R/H; 45±5 %.

In the above example, the immersion in the molten salt of $KNO_2$ was carried out in a single process. Chemically strengthening the glass substrate by immersing the glass substrate in a $KNO_3$ molten salt may be added, and the process according to the present invention may be performed prior to or after the chemical strengthening thereof. Alternatively, the $KNO_2$ molten salt may be prepared into a mixed salt of $KNO_3$ and $KNO_2$, so that the chemical strengthening and etching treatment may be concurrently carried out.

EXAMPLES 2 TO 8 AND COMPARATIVE EXAMPLE

A glass disk substrate was prepared as in Example 1, except that the type of the salt and the etching condition used were modified as is shown in Table 1.

The surface roughness and strengthening degree of the glass substrates were measured. The table shows these results as well.

It was verified that the etching roughness and strengthening degree were dependent upon temperature and time of treatment.

Magnetic disks were prepared using glass disk substrates, which were then subjected to the routine CSS test as in Example 1. The results are shown also in Table 1.

The evaluated friction is represented by the symbol ◯ if the static frictional factor is not more than 1.0; it is represented by the symbol X if the factor exceeds 1.0. The evaluated power is represented by the symbol ◯ if the TAA power is not less than 90 %; it is represented by the symbol X if the power is less than 90 %.

TABLE 1

| Types of Salt | | Etching condition | | Measured value of roughness | | Strengthening Edge strengthening degree n = 50 | CSS resistance | |
|---|---|---|---|---|---|---|---|---|
| Example No. | Comp. | Time | Temp. (°C.) | Roughness Ra (Å) | Pitch (Å) | | Fric. | Po. (MPa) |
| Ex. 1 | $KNO_2$ content/$KNO_3$ 0 mol % | 6 hr. | 420 | 10 | 100 | mean = 380 $\sigma_{n-1}$ = 89 | X | ◯ |
| Ex. 2 | $KNO_2$ content/$KNO_3$ 5 mol % | 6 hr. | 420 | 9 | 250 | — | ◯ | ◯ |
| Ex. 3 | $KNO_2$ content/$KNO_3$ 10 mol % | 6 hr. | 440 | 30 | 400 | mean = 440 $\sigma_{n-1}$ = 89 | ◯ | ◯ |
| Ex. 4 | $KNO_2$ content 100 mol % | 40 sec. | 440 | 20 | 300 | — | — | — |
| Ex. 5 | $KNO_2$ | 90 sec. | 440 | 50 | 700 | — | ◯ | ◯ |

TABLE 1-continued

| Example No. | Types of Salt Comp. | Etching condition Time | Etching condition Temp. (°C.) | Measured value of roughness Roughness Ra (Å) | Measured value of roughness Pitch (Å) | Strengthening Edge strengthening degree n = 50 | CSS resistance Fric. | CSS resistance Po. (MPa) |
|---|---|---|---|---|---|---|---|---|
| Ex. 6 | content 100 mol % $KNO_2$ content 100 mol % | 150 sec. | 440 | 200 | 1400 | — | — | — |
| Ex. 7 | $KNO_3$ 85 mol % $Ca(NO_3)_2$ 15 mol % in nitrate | 50 hr. | 540 | 80 | 1000 | — | — | — |
| Ex. 8 | $KNO_3$ 85 mol % $Ti(NO_2)_2$ 15 mol % in nitrate | 80 hr. | 520 | 70 | 600 | — | — | — |

In the above Examples, the glass substrate immersed in the molten salt was a substrate having a smooth surface however, the substrate may be a substrate having a surface on which irregularities have been previously formed through, for example, mechanical processing.

Commercially available low-cost soda lime glass capable of undergoing chemical strengthening was used as the glass substrate in the above examples. The Examples, however, may be performed using other types of glass such as non-alkaline glass, low-alkaline glass, borosilicate glass, quartz glass and the like.

In accordance with the present invention, a single process is used to prepare nearly ideal surface irregularities for a magnetic disk substrate made of glass. The process of the present invention can be easily carried out for large-scale treatment. With relative ease with respect to process control compared with the control of hydrofluoric acid concentration necessary when using other processes. Furthermore, the process does not require large-scale disposal equipment to protect against pollution since no fluorine is used.

What is claimed is:

1. Process of producing a magnetic disk substrate comprising etching the surface of a soda lime silicate glass substrate and forming minute irregularities interspersed on an original surface thereof, said etching is carried out at about 400° C. to 450° C. by employing 5 to 100 nitrite ion mol % of a molten nitrite salt such that the size of the irregularities so formed is about 0.025 μm to 0.07 μm in pitch and an arithmetical mean deviation of the depth of said irregularities is about 1.9 nm to 7 nm.

2. Process of producing a magnetic disk substrate comprising the steps of:
   etching a surface of a glass substrate by employing a molten nitrite salt;
   forming minute irregularities on the surface thereof; and
   coating the surface of the glass substrate with a magnetic coating.

3. Process of producing a magnetic disk substrate comprising the steps of:
   etching the surface of a soda lime silicate glass substrate, said etching being carried out at about 400° C. to 450° C. by employing 5 to 100 nitrite ion mol % of a molten nitrite salt;
   forming minute irregularities interspersed on an original surface thereof such that the size of the irregularities so formed is about 0.025 μm to 0.07 μm in pitch and an arithmetical means deviation of the depth of said irregularities is about 1.9 nm to 7 nm; and
   coating the surface with a magnetic coating.

4. The method of claim 2, wherein said etching is carried out at a temperature below 550° C.

* * * * *